Sept. 18, 1934.  D. W. VOORHEES, JR  1,973,938
WAGON CONSTRUCTION
Filed Nov. 16, 1933  2 Sheets-Sheet 1
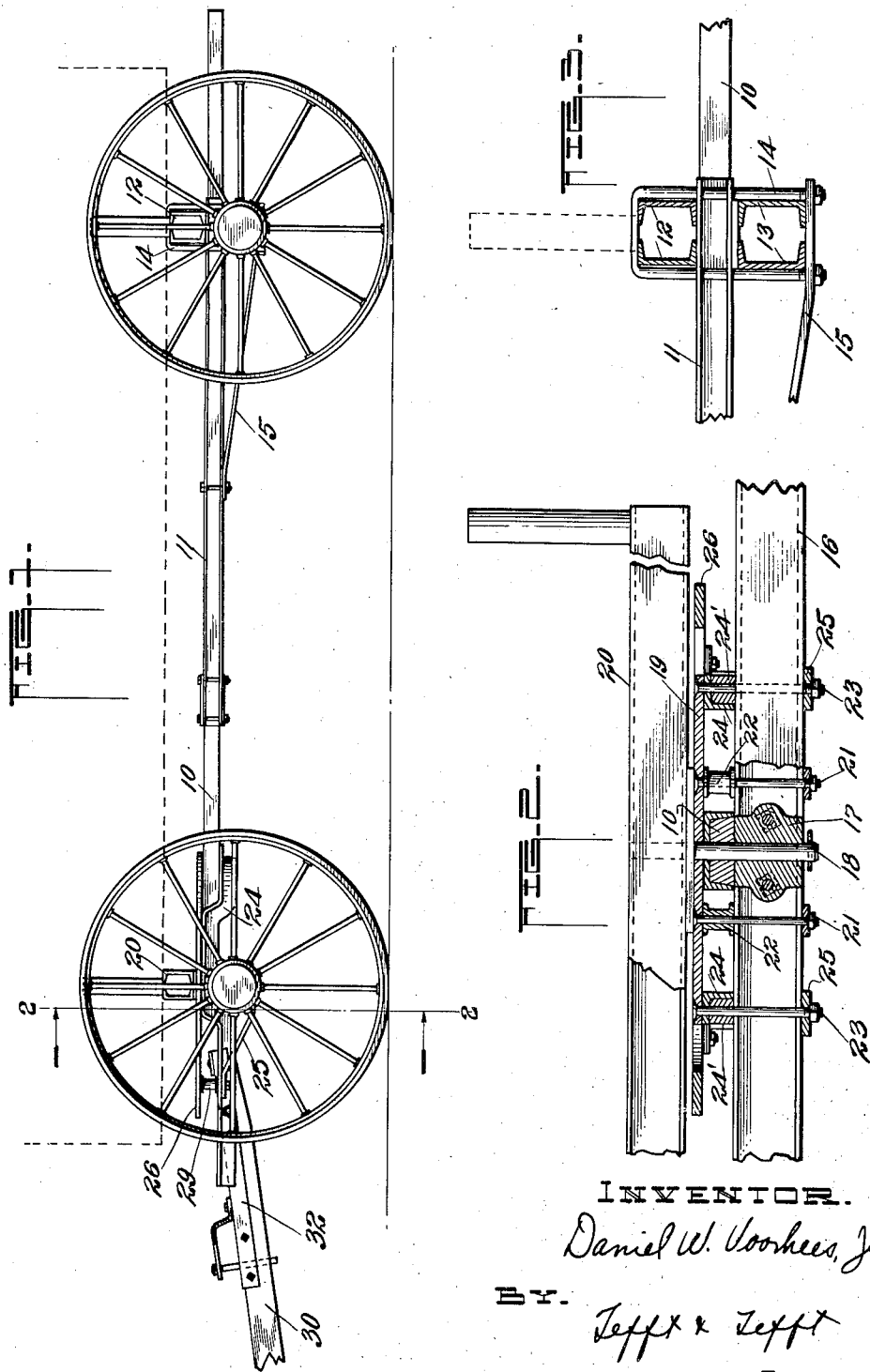

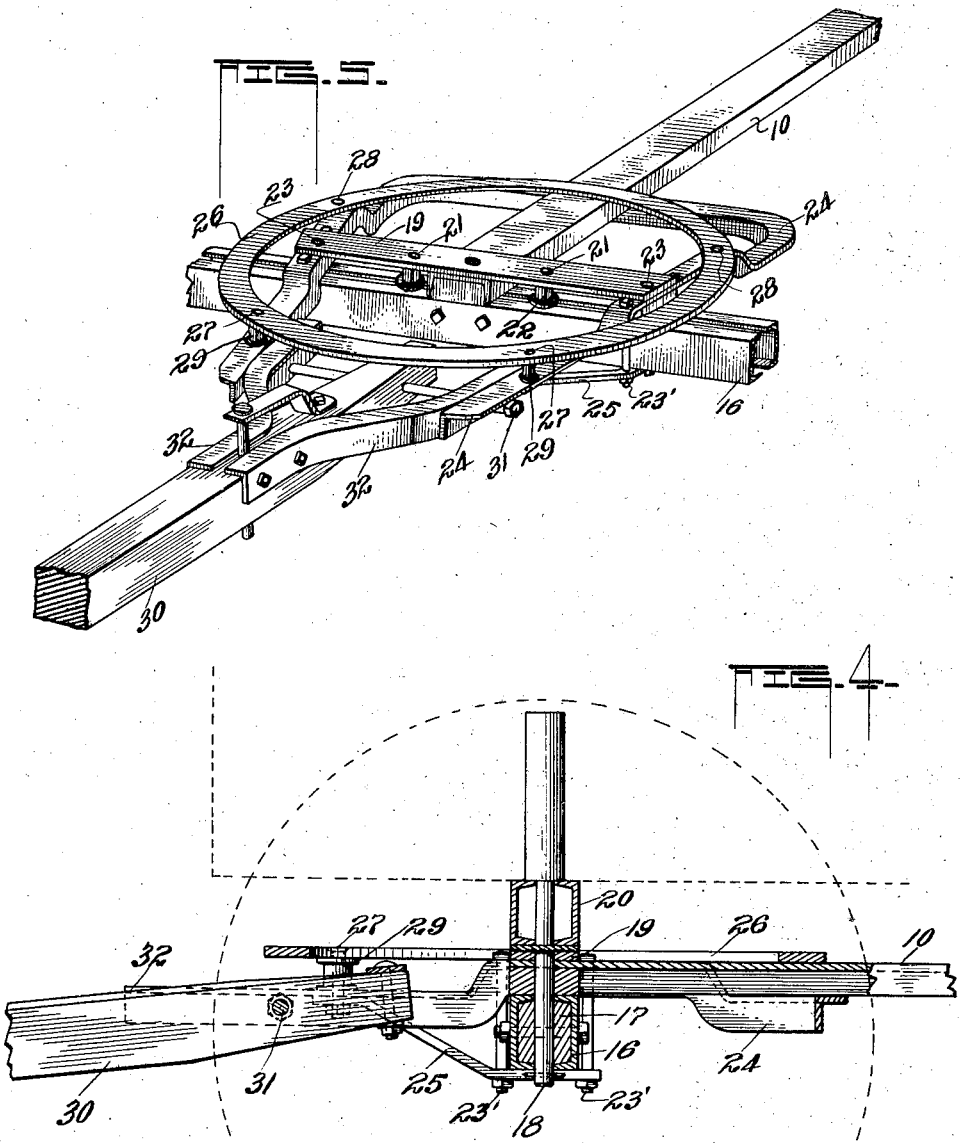

Patented Sept. 18, 1934

1,973,938

UNITED STATES PATENT OFFICE 1,973,938

WAGON CONSTRUCTION

Daniel W. Voorhees, Jr., Peru, Ill.

Application November 16, 1933, Serial No. 698,223

2 Claims. (Cl. 280—113)

This invention relates to wagon construction and has for one of its objects the provision of a novel construction affording superior strength and simplicity of structure in the swiveled portion associated with the front axle thereof.

Another object is to provide a construction adapted to support the forward bolster of a wagon in horizontal alignment with the rear bolster so as to afford a low swung construction with which wheels of substantially small diameter and of equal size may be used on front and rear axles.

Other objects will appear in the following description and accompanying drawings, in which—

Fig. 1 is a side elevational view of a wagon frame in which my invention is embodied;

Fig. 2 is a fragmented front elevational view taken approximately from line 2—2 in Fig. 1, showing details of construction to be described;

Fig. 3 is a fragmented sectional view showing details of construction of the rear axle to be described;

Fig. 4 is a fragmented side elevational sectional view showing details of construction of the front axle to be described; and Fig. 5 is a fragmental perspective detail view of the front axle assembly to be described.

Referring to the drawings, Fig. 1 discloses my frame construction as generally comprising a reach 10 to which is adjustably secured a rear axle assembly designated 11. This assembly will not be described further than to say that, as shown in Fig. 3, the bolster is made up from channels 12 while the axle is similarly made up from channels 13, the whole secured together by means of U-bolts 14, which bolts also hold brace members 15 with the latter secured to a forward portion of the frame. The simplicity and utility of the construction are thought obvious.

While I have herein shown and described my invention as constructed from steel, it will be understood that other materials, such as wood, may be utilized therein without alteration of principle.

Figs. 2, 4 and 5 will illustrate that the front axle assembly comprises an axle 16 made up in a manner similar to rear axle 13. In the center of the axle is secured a block 17 which forms a bearing for the king bolt 18, the latter passing upwardly through the reach 10, and a sand board 19 to the front bolster 20. The reach swivels upon the king bolt in the conventional manner.

Fig. 2 indicates that sand board 19 is secured to axle 16 by means of bolts 21 and spaced therefrom by spacers 22. At its outer ends it is further secured to the axle by means of bolts 23, which pass through the hound 24, to the axle and also include braces 25.

As best shown in Figs. 4 and 5, the hound is additionally secured to the axle by means of bolts 23′ which pass through the hound downwardly on either side of the axle and through braces 25, thereby forming a secure fastening means for the hound. The bearing surface upon the axle is extended by filler blocks 24′ best shown in Fig. 2.

Referring to Figs. 4 and 5, it will be noted that the hound 24 is of special form in that its rearward and forward portions occupy one plane while that portion which passes over the axle is stepped up to such an extent as to complement the thickness of the reach and to place the forward tongue supporting portion in plane with the rear portion. Fig. 4 clearly indicates that in that portion contacting with the reach, the upper surface of the hound passes under the reach substantially in line with the upper surface of the axle.

By means of this arrangement the reach is permitted to rest directly upon the front and rear axles in a substantially horizontal line while the hound passes over the axle and under the reach and thus eliminates the necessity of elevating the reach or bolster above the front axle as is the case with the conventional front axle assembly.

Since the axles, reach and bolsters all rest in parallel horizontal lines, it is clear that four wheels of equal size may be used to support a low wagon box in horizontal position.

Figs. 4 and 5 will indicate that a fifth wheel 26 is secured upon the hound at four points, two forward of the axle designated 27 and the two rearward of the axle designated 28. At the points 28 the wheel is secured directly upon the surface of the stepped up portion of the hound while at the points 27 it is secured upon the forward depressed extending portions, with spacers 29 supporting the forward portion of the wheel in horizontal plane with the rear portion, the means of securement, bolts or rivets, also securing braces 25 to the hound.

The tongue 30 is obviously swivelly supported upon the forward extending portions of the hound by means of a bolt or pin 31. Braces 32 act to hold the tongue in proper centrally spaced relation and add necessary strength.

What I claim is:

1. A truck construction including in combination an axle, a hound rigidly secured thereto, a reach swivelly supported thereon, a sand board secured upon the hound and axle in such relative position as to pass over the reach, the hound being so fashioned that the central portion of either side thereof rests upon the upper side of the axle with the rear portion depressed to such an extent that its upper surface lies in plane with the upper surface of the axle whereby it passes below the reach when the same rests in horizontal position and a fifth wheel secured upon the upper surface of that portion of the hound resting upon the axle, whereby the under surface of the fifth wheel lies in plane with and passes over the upper surface of the reach.

2. A truck construction including in combination an axle, a hound rigidly secured thereto having plural portions extending forwardly of the axle to support a tongue, a raised portion passing over the axle, a rear portion connecting the forwardly extending portions and lying in plane therewith, a fifth wheel secured upon the upper surface of the raised portion and forwardly extending portions, a sand board secured upon the upper surface of the raised portion in spaced relation with the axle and in plane with the fifth wheel, a reach resting upon the upper surface of the axle and passing between the rearward portion of the hound and the fifth wheel, the reach being swivelly secured between the sand board and axle, the foregoing being so proportioned that the upper surface of the rear and forwardly extending portions of the hound lie in plane with the upper surface of the axle, while the under surface of the fifth wheel lies in plane with the upper surface of the raised portion of the hound with the reach, hound and fifth wheel all lying in horizontal plane parallel with the upper surface of the axle.

DANIEL W. VOORHEES, Jr.